United States Patent
Stubbs et al.

(10) Patent No.: US 10,144,587 B2
(45) Date of Patent: Dec. 4, 2018

(54) WEDGE BASED LIFTING DEVICE AND SYSTEM

(71) Applicant: Amazon Technologies, Inc., Seattle, WA (US)

(72) Inventors: Andrew Stubbs, Waltham, MA (US); Robert Michael Shydo, Jr., Pelham, NH (US)

(73) Assignee: Amazon Technologies, Inc., Seattle, WA (US)

( * ) Notice: Subject to any disclaimer, the term of this patent is extended or adjusted under 35 U.S.C. 154(b) by 191 days.

(21) Appl. No.: 15/276,566

(22) Filed: Sep. 26, 2016

(65) Prior Publication Data

US 2018/0086561 A1    Mar. 29, 2018

(51) Int. Cl.
| | |
|---|---|
| *B62D 21/14* | (2006.01) |
| *B66F 9/075* | (2006.01) |
| *B65G 1/137* | (2006.01) |
| *G05D 1/02* | (2006.01) |

(52) U.S. Cl.
CPC .......... *B65G 1/137* (2013.01); *B66F 9/07522* (2013.01); *G05D 1/021* (2013.01); *G05D 2201/0216* (2013.01)

(58) Field of Classification Search
USPC .......................................................... 700/214
See application file for complete search history.

(56) References Cited

U.S. PATENT DOCUMENTS

| | | | |
|---|---|---|---|
| 8,280,547 B2 | 10/2012 | D'Andrea et al. | |
| 8,606,392 B2* | 12/2013 | Wurman ............ | G05B 19/4189 700/214 |
| 9,002,506 B1* | 4/2015 | Agarwal ................ | B65G 1/137 700/216 |
| 9,087,314 B2 | 7/2015 | Hoffman et al. | |
| 2009/0107806 A1 | 4/2009 | Mendenhall | |
| 2012/0282070 A1* | 11/2012 | D'Andrea ............... | B66F 9/063 414/495 |
| 2014/0228999 A1* | 8/2014 | D'Andrea ............... | B66F 9/063 700/214 |
| 2015/0353137 A1* | 12/2015 | Schmidt ................. | B62D 21/14 180/20 |

(Continued)

FOREIGN PATENT DOCUMENTS

DE    10 2013 000259    7/2014

OTHER PUBLICATIONS

International Search Report for International Application No. PCT/US2017/053250 dated Feb. 16, 2018.

(Continued)

*Primary Examiner* — Kyle O Logan
(74) *Attorney, Agent, or Firm* — Knobbe Martens Olson & Bear LLP

(57) ABSTRACT

Features are disclosed for a mobile drive unit and systems including mobile drive units that eliminate the need for dedicated lifting motors. The mobile drive unit arrangements described leverage existing motors used to drive the rolling elements (e.g., wheels) of the mobile drive unit to perform the lifting. For example, a mobile drive unit may include four locomotion motors. Because each motor can be individually controlled, the distance between front and rear (or left and right) rolling elements can be used to actuate mechanisms for lifting payloads without requiring a dedicated lifting motor.

12 Claims, 10 Drawing Sheets

(56) References Cited

U.S. PATENT DOCUMENTS

2016/0062345 A1    3/2016  Stubbs et al.
2016/0229631 A1*   8/2016  Kimura ................ G05D 1/0291
2016/0236869 A1*   8/2016  Kimura ................ G05D 1/0291
2016/0246301 A1*   8/2016  Kazama ............... G05D 1/0274
2017/0341465 A1*  11/2017  Zdrahal ............... B60B 19/003

OTHER PUBLICATIONS

Partial International Search for International Application No. PCT/US2017/053250 dated Dec. 19, 2017.

* cited by examiner

US 10,144,587 B2

WEDGE BASED LIFTING DEVICE AND SYSTEM

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, as modern inventory systems continue to increase in size and complexity, any reduction in a number and/or cost of components included in the inventory system can result in a non-trivial cost savings when multiplied across a large number of units using those components within the inventory systems.

BRIEF DESCRIPTION OF THE DRAWINGS

Embodiments of various inventive features will now be described with reference to the following drawings. Throughout the drawings, the examples shown may re-use reference numbers to indicate correspondence between referenced elements. The drawings are provided to illustrate example embodiments described herein and are not intended to limit the scope of the disclosure.

DETAILED DESCRIPTION

Modern inventory systems may include mobile drive units that receive commands to perform tasks such moving to a location, lifting a payload at the location, and carrying the payload to another location. A mobile drive unit may be an autonomous asset, such as a robot or a drone, and may include sensors to detect aspects of an operational area in which it is being implemented and execute received commands.

Motors are an important and expensive part of a mobile drive unit. The motors drive a rolling element that moves the mobile drive unit around an operational area (e.g., warehouse, luggage facility, hospital, hotel, educational institution, store, etc.). Examples of rolling elements include wheels, Mecanum wheels, omni wheels, balls, treads, and other structure for holonomic motion. One or more motors may also be included to lift payloads. Each motor added to the mobile drive unit represents additional cost to manufacture and maintain the mobile drive unit. Each motor also presents additional resource costs to the mobile drive unit as the incremental motor requires an additional resource to control the motor and process commands that require operating the additional motor.

Described below are implementations of a mobile drive unit that eliminate the need for dedicated lifting motors. The implementations shown and described leverage the existing drive system (e.g., one or more motors, transmission, gearing, etc.) of the mobile drive unit that are used to provide force to drive the rolling elements to also perform the lifting. For example, consider a mobile drive unit with four locomotion motors. By controlling each motor individually, the distance between front and rear (or left and right) rolling elements can be used to actuate mechanisms for lifting payloads without requiring a dedicated lifting motor.

Figure 1:
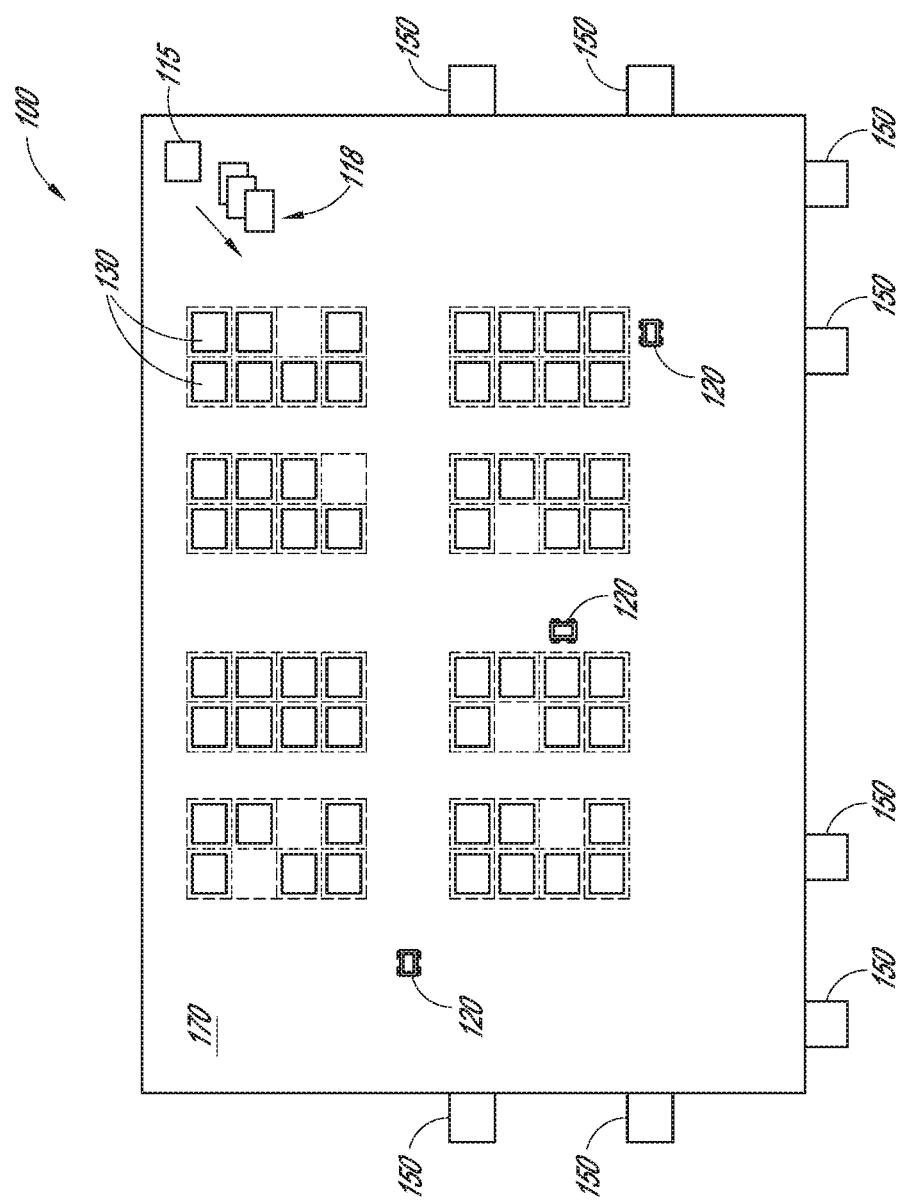
FIG. 1 is a pictorial diagram depicting an illustrative inventory system environment.

FIG. 1 is a pictorial diagram depicting an illustrative inventory system environment. FIG. 1 illustrates the components of an inventory system 100 in which a mobile drive unit 120 may operate. The inventory system 100 may include a management device 115, one or more mobile drive units 120, one or more inventory holders 130, and one or more inventory stations 150. A mobile drive unit may transport one or more of the inventory holders 130 between points within a workspace 170 in response to commands communicated by the management device 115. Each inventory holder 130 may store one or more types of inventory items. As a result, the inventory system 100 is capable of moving inventory items between locations within the workspace 170 to facilitate the entry, processing, and/or removal of inventory items from the inventory system 100 and the completion of other tasks involving inventory items.

The management device 115 may assign tasks to appropriate components of the inventory system 100 and coordinate operation of the various components in completing the tasks. These tasks may relate not only to the movement and processing of inventory items, but also to the management and maintenance of the components of the inventory system 100. For example, the management device 115 may assign portions of the workspace 170 as parking spaces for the mobile drive units 120, the scheduled recharge or replacement of mobile drive unit batteries, the storage of empty inventory holders, or any other operations associated with the functionality supported by the inventory system 100 and its various components. The management device 115 may identify components of the inventory system 100 to perform these tasks and communicate appropriate commands and/or data to the identified components to facilitate completion of these operations.

Although shown in FIG. 1 as a single, discrete component, the management device 115 may represent multiple components and may represent or include portions of the mobile drive units 120 or other elements of the inventory system 100. Interactions between a particular mobile drive unit and the management device 115 that are described may, in some embodiments, represent peer-to-peer communication between two or more of the mobile drive units 120. The components and operation of an example embodiment of the management device 115 are discussed further below with respect to FIG. 8.

A mobile drive unit may be implemented as an independent, self-powered device configured to move about the workspace 170. Further examples of inventory systems and features that may be included in an inventory system are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS," each of which is incorporated herein by reference in its entirety.

The mobile drive units 120 may be capable of communicating with the management device 115 to receive information identifying selected inventory holders 130, to transmit the locations of the mobile drive units 120, or to exchange any other suitable information to be used by the management device 115 or the mobile drive units 120 during operation. The mobile drive units 120 may communicate with the management device 115 wirelessly and/or using wired connections between the mobile drive units 120 and the management device 115. As one example, some mobile drive units 120 may communicate with the management device 115 and/or with one another using 802.11, BLUETOOTH®, or Infrared Data Association (IrDA) standards, or any other appropriate standardized wireless communication protocol. As another example, in a tracked inventory system, tracks or other guidance elements upon which the mobile drive units 120 move may be wired to facilitate communication between the mobile drive units 120 and other components of the inventory system 100.

The inventory holders 130 may store inventory items. One or more of the inventory holders 130 may include multiple storage bins with each storage bin capable of holding one or more types of inventory items. The inventory holders 130 may include structural features to facilitate carrying, rolling, and/or otherwise moving the inventory holders 130 by mobile drive units. The inventory holder 130 may include propulsion means to supplement that provided by a mobile drive unit when moving inventory holder 130.

Inventory items 140 may hang from hooks or bars (not shown) within or on one or more of the inventory holders 130. An inventory holder may store inventory items 140 in any appropriate manner within the inventory holder and/or on the external surface of inventory holder.

An inventory holder may include a plurality of faces, and each bin of the inventory holder may be accessible through one or more faces of the inventory holder. For example, an inventory holder may include four faces. In such an embodiment, bins located at a corner of two faces may be accessible through either of those two faces, while each of the other bins is accessible through an opening in one of the four faces. One or more of the mobile drive units 120 may be configured to rotate such an inventory holder at appropriate times to present a particular face and the bins associated with that face to an operator or other components of inventory system 100.

Inventory items represent any objects suitable for storage, retrieval, and/or processing in an automated inventory system. For the purposes of this description, "inventory items" may represent any one or more objects of a particular type that are stored in the inventory system 100.

A particular inventory holder 130 may be considered to be currently "storing" a particular inventory item if the inventory holder 130 currently holds one or more units of that type. As one example, the inventory system 100 may represent a mail order warehouse facility, and inventory items may represent merchandise stored in the warehouse facility. During operation, one or more of the mobile drive units 120 may retrieve the inventory holders 130 containing one or more inventory items requested to be packed for delivery to a customer or the inventory holders 130 carrying pallets containing aggregated collections of inventory items for shipment. In some implementations, containers (e.g., boxes) including completed orders may themselves represent inventory items.

The inventory system 100 may include one or more inventory stations 150. An inventory station may represent a location designated for the completion of particular tasks involving inventory items. Such tasks may include the removal of inventory items from an inventory holder, the introduction of inventory items into an inventory holder, the counting of inventory items in an inventory holder, the decomposition of inventory items (e.g., from pallet- or case-sized groups to individual inventory items), the consolidation of inventory items between inventory holders, and/or the processing or handling of inventory items in any other suitable manner.

The inventory stations 150 may represent physical locations where a particular task involving inventory items can be completed within the workspace 170. In some implementations, the inventory stations 150 may represent both the physical location and also any appropriate equipment for processing or handling inventory items, such as scanners for monitoring the flow of inventory items in and out of the inventory system 100, communication interfaces for communicating with the management device 115, and/or any other suitable item processing components.

The inventory stations 150 may be controlled, entirely or in part, by human operators or may be fully automated. Moreover, the human or automated operators of inventory stations may be capable of performing certain tasks upon inventory items, such as packing, counting, or transferring inventory items, as part of the operation of the inventory system 100.

The workspace 170 represents an area associated with the inventory system 100 in which the mobile drive units 120 can move and/or the inventory holders 130 can be stored. For example, the workspace 170 may represent all or part of the floor of a mail-order warehouse in which the inventory system 100 operates. Although FIG. 1 shows, for the purposes of illustration, an inventory system in which the workspace 170 includes fixed, predetermined, and finite physical spaces, an inventory system may include mobile drive units and/or inventory holders that are configured to operate within a workspace that is of variable dimensions and/or an arbitrary geometry. While the workspace 170 shown in FIG. 1 is entirely enclosed in a building, the inventory system 100 may utilize one or more workspaces in which some or all of the workspaces are located outdoors, within a vehicle (such as a cargo ship), or otherwise unconstrained by any fixed structure.

The management device 115 may select appropriate components to complete particular tasks and transmit task assignment messages 118 to the selected components to trigger completion of the relevant tasks. The task assignment message 118 may include information identifying one or more tasks to be completed by at least one component of the inventory system 100. These tasks may relate to the retrieval, storage, replenishment, and counting of inventory items and/or the management of mobile drive units, inventory holders, inventory stations, and/or other components of inventory system 100. Depending on the component and the task to be completed, a particular task assignment message 118 may include information identifying locations, components, and/or actions associated with the corresponding task and/or any other appropriate information to be used by the relevant component in completing the assigned task.

The management device 115 may generate task assignment messages 118 based, in part, on inventory requests that the management device 115 receives from other components of the inventory system 100 and/or from external components in communication with the management device 115.

An inventory request may identify particular operations to be completed involving inventory items stored or to be stored within the inventory system 100. For example, an inventory request may represent a shipping order specifying particular inventory items that have been purchased by a customer and that are to be retrieved from the inventory system 100 for shipment to the customer. The management device 115 may also generate task assignment messages 118 independently of such inventory requests, as part of the overall management and maintenance of the inventory system 100. For example, the management device 115 may generate one or more task assignment messages in response to the occurrence of a particular event (e.g., in response to a mobile drive unit requesting a space to park), according to a predetermined schedule (e.g., as part of a daily start-up routine), or at any appropriate time based on the configuration and characteristics of the inventory system 100. After generating one or more task assignment messages 118, the management device 115 may transmit the generated task assignment messages 118 to appropriate components for completion of the corresponding task. The relevant components may then execute their assigned tasks.

One component that may receive a task is a mobile drive unit. One type of task that may be assigned to a mobile drive unit is to lift and move an object within the workspace 170. The mobile drive unit may include structural elements to facilitate lifting without the use of an independent lifting motor.

Figure 2A:
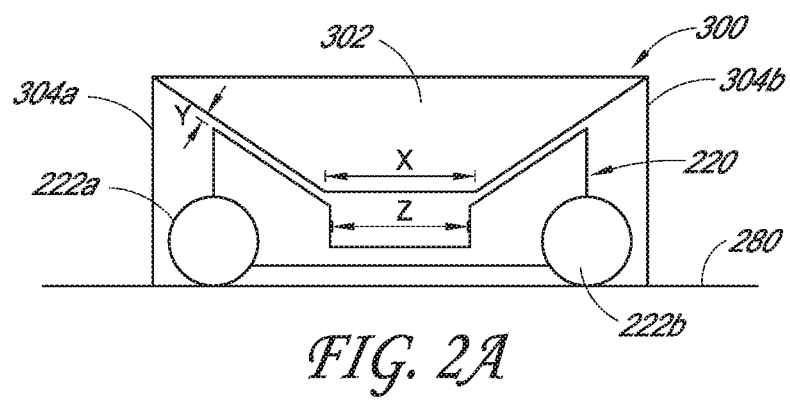
FIG. 2A is a pictorial diagram depicting illustrative components of an embodiment of a mobile drive unit configured for wedge based lifting prior to lifting an inventory holder including a wedge.

FIG. 2A is a pictorial diagram depicting illustrative components of an embodiment of a mobile drive unit configured for wedge based lifting prior to lifting an inventory holder including a wedge. The mobile drive unit 220 may have received a command from the management device 115 to move an inventory holder 300 from a first location to a second location within the workspace 170.

The mobile drive unit 220 shown in FIG. 2A is positioned beneath the inventory holder 300. The inventory holder 300 may include a wedge 302 supported between a first side 304a and a second side 304b of the inventory holder 300. In the illustrated embodiment, the first side 304a and the second side 304b are perpendicular to a ground surface 280. A first rolling element 222a and a second rolling element 222b may be included in the mobile drive unit 220. Each rolling element (e.g., 222a and 222b) may be independently driven by a force from a drive system. In some implementations, each rolling element may be driven by a corresponding motor included in the drive system.

As shown in FIG. 2A, the mobile drive unit 220 is expanded such that a space Z is created near the middle of the mobile drive unit 220. The space Z corresponds to a width Z of the bottom of the wedge 302. The mobile drive unit 220 may be separated from the wedge 302 by a gap having a distance Y. The gap allows the mobile drive unit 220 to adjust its location beneath the inventory holder 300 to ensure proper alignment for lifting. The proper alignment may include sensing an identifier for a location beneath the inventor holder 300 such as on the ground surface 280 or on the bottom surface of the wedge 302. For example, an identifier indicating the center point of the wedge 302 may be included on the inventory holder 300. Using location information associated with the identifier and the current location of the mobile drive unit 220, the mobile drive unit 220 can adjust its position to be centered under the inventory holder 300.

Figure 2B:
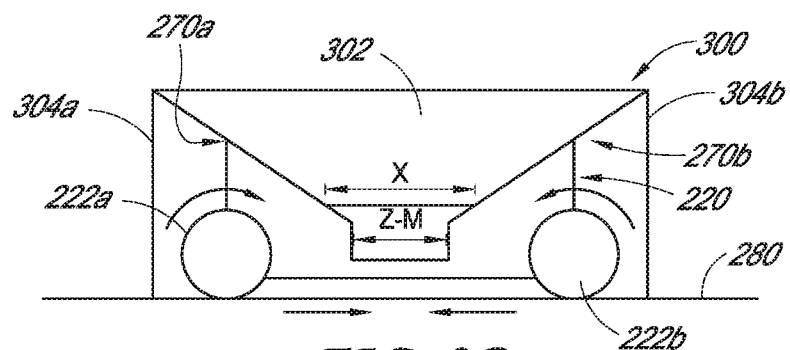
FIG. 2B is a pictorial diagram depicting illustrative components of the mobile drive unit shown in FIG. 2A preparing to lift the inventory holder.

FIG. 2B is a pictorial diagram depicting illustrative components of the mobile drive unit shown in FIG. 2A preparing to lift the inventory holder. In FIG. 2B, the gap is no longer present between the mobile drive unit 220 and the wedge 302. The wedge 302 is supported at point 270a and point 270b on the mobile drive unit 220. To support the wedge 302, the rolling elements 222a and 222b are each rotated toward the middle of the mobile drive unit 220 to narrow the space Z. The narrowing may produce a shortened space Z−M where M is a distance greater than zero. The inventory holder 300 in FIG. 2B is still on the ground surface 280.

Figure 2C:
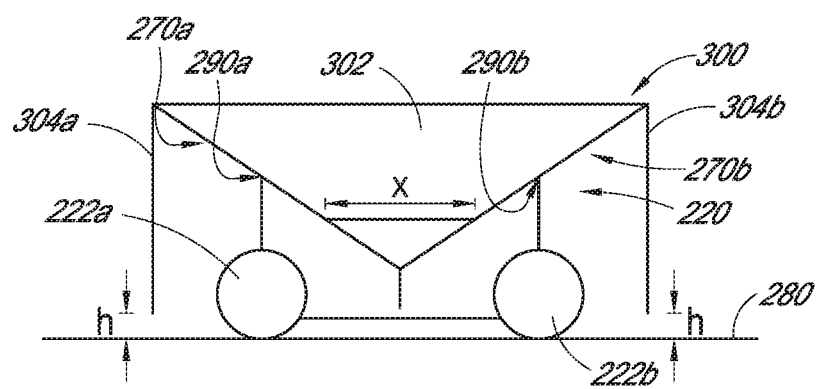
FIG. 2C is a pictorial diagram depicting illustrative components of the mobile drive unit shown in FIG. 2B lifting the inventory holder.

FIG. 2C is a pictorial diagram depicting illustrative components of the mobile drive unit shown in FIG. 2B lifting the inventory holder. The rolling elements 222a and 222b continue rotating to close the space Z−M shown in FIG. 2B. In closing the space, the inventory holder 300 is lifted off of the ground surface 280 by a height h. The lift is caused by the force applied by the rolling elements 222a and 222b against the wedge 320. As the force is applied, the wedge 320 lifts such the wedge 302 is now supported at second points 290a and 290b. The second points 290a and 290b are located further toward the bottom of the wedge 320 than the points 270a and 270b also shown in FIG. 2C.

Figure 3A:
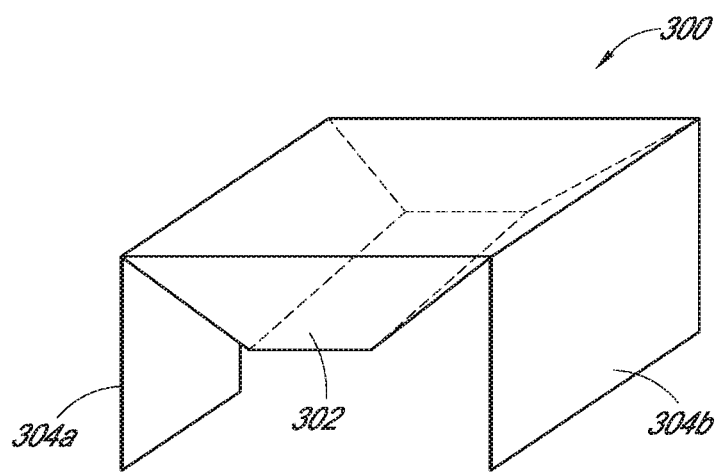
FIG. 3A is a pictorial diagram depicting an isometric view of the inventory holder shown in FIGS. 2A-2C.

FIG. 3A is a pictorial diagram depicting an isometric view of the inventory holder shown in FIGS. 2A-2C. As illustrated in FIG. 3A, the inventory holder 300 includes the first side 304a and the second side 304b. The space between the first side 304a and the second side 304b allow a mobile drive unit to move beneath the inventory holder 300 and align with the wedge 302. The wedge 302 may be shaped in a variety of ways two of which are shown in FIG. 3B and FIG. 3C.

Figure 3B:
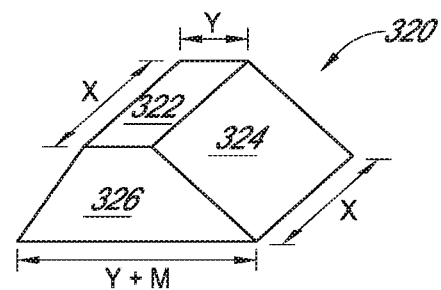
FIG. 3B is a pictorial diagram depicting an embodiment of a wedge that may be included in the inventory holder shown in FIG. 3A.

FIG. 3B is a pictorial diagram depicting an embodiment of a wedge that may be included in the inventory holder shown in FIG. 3A. The wedge 320 shown in FIG. 3B is oriented upside down from the wedge 302 shown in FIG. 3A to facilitate description of the relationship between a bottom surface 322 of the wedge 320 and the other faces of the wedge 320. A length-wise sloped surface 324 is shown having a length X equal to the length X of the bottom surface 322. The bottom surface 322 also has a width Y. The top of the wedge 320 also has a width, but the width at the top of the wedge 320 is greater than the width Y by an amount M. The shape of the wedge 320 may generally be described as an isosceles trapezoid.

Figure 3C:
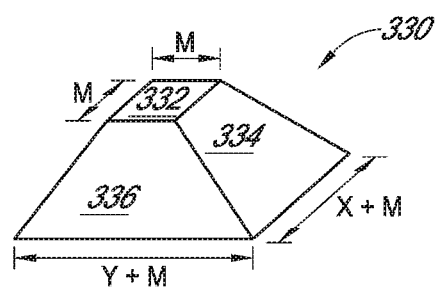
FIG. 3C is a pictorial diagram depicting another embodiment of a wedge that may be included in the inventory holder shown in FIG. 3A.

FIG. 3C is a pictorial diagram depicting another embodiment of a wedge that may be included in the inventory holder shown in FIG. 3A. The wedge 330 shown in FIG. 3B is oriented upside down from the wedge 302 shown in FIG. 3A to facilitate description of the relationship between a bottom surface 332 and the other faces of the wedge 330. The bottom surface 332 is a square having sides of length M. A length-wise sloped surface 334 is shown having a length X+M, where X is a length greater than zero. A second sloped surface 336 perpendicular to the length-wise sloped surface 334 is also included in the wedge 330. The second sloped surface 336 has a width Y+M, where Y is a length is greater than zero. In some implementations, Y and X may be equal. The shape of the wedge 320 may generally be described as a pyramid with a flat top (e.g., a pyramid without a point).

The lift systems and devices described in FIG. 2A through FIG. 3C include a wedge that is included as part of the inventory holder. Similar lift can be achieved in implementations where the wedge is detached from the inventory holder and included as part of the mobile drive unit.

Figure 4A:
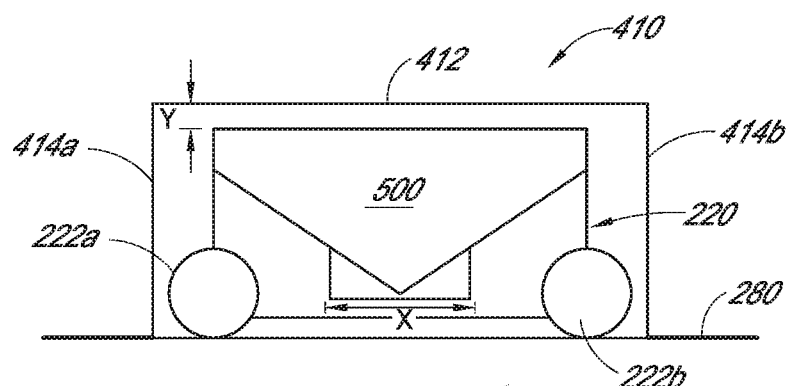
FIG. 4A is a pictorial diagram depicting illustrative components of an embodiment of a mobile drive unit including a wedge and configured for wedge based lifting prior to lifting an inventory holder.

FIG. 4A is a pictorial diagram depicting illustrative components of an embodiment of a mobile drive unit including a wedge and configured for wedge based lifting prior to lifting an inventory holder. The mobile drive unit 220 may have received a command from the management device 115 to move an inventory holder 410 from a first location to a second location within the workspace 170.

The mobile drive unit 220 shown in FIG. 4A is positioned beneath the inventory holder 410. In the illustrated embodiment, the mobile drive unit 220 includes a wedge 500. The inventory holder 410 may include a first side 414a and a second side 414b. The first side 414a and the second side 414b may be perpendicular to the ground surface 280. A top portion 412 may be supported by the first side 414a and the second side 414b. The wedge 500 may be separated from a top portion 412 of the inventory holder 410 by a gap of distance Y. The first rolling element 222a and the second rolling element 222b may be included in the mobile drive unit 220. Each rolling element (e.g., 222a and 222b) may be independently driven by a force from a drive system. In some implementations, each rolling element may be driven by a corresponding motor included in the drive system. The gap of distance Y allows the mobile drive unit 220 to adjust its location beneath the inventory holder 410 to ensure proper alignment for lifting. The proper alignment may include sensing an identifier for a location beneath the inventory holder 410 such as on the ground surface 280 or on the bottom surface of the wedge 500. Using location information associated with the identifier and the current location of the mobile drive unit 220, the mobile drive unit 220 can adjust its position to be centered under the inventory holder 410. As shown in FIG. 2A, the mobile drive unit 220 is expanded such that a space Z is created near the middle of the mobile drive unit 220.

Figure 4B:
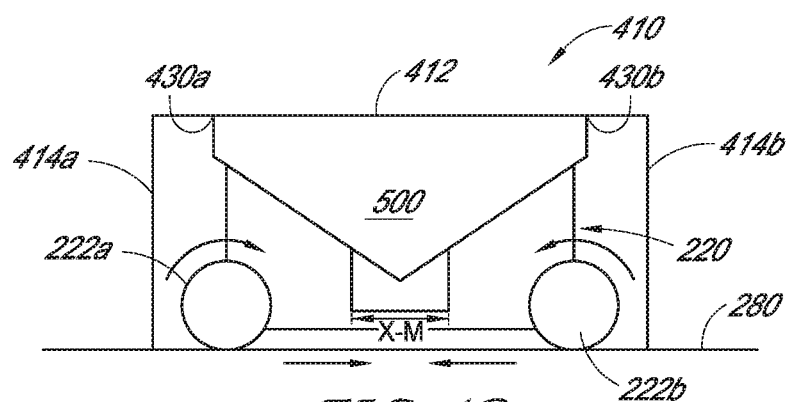
FIG. 4B is a pictorial diagram depicting illustrative components of the mobile drive unit shown in FIG. 4A preparing to lift the inventory holder.

FIG. 4B is a pictorial diagram depicting illustrative components of the mobile drive unit shown in FIG. 4A preparing to lift the inventory holder. In FIG. 4B, the gap Y is no longer present between the wedge 500 and the top portion 412 of the inventory holder 410. The wedge 500 is engaged with the top portion 412 at point 430a and point 430b. To engage, the rolling elements 222a and 222b each rotate toward the middle of the mobile drive unit 220 to narrow the space having a distance X. The narrowing may provide a shortened space with a distance X−M where M is a distance greater than zero. The inventory holder 410 in FIG. 4B is still on the ground surface 280.

Figure 4C:
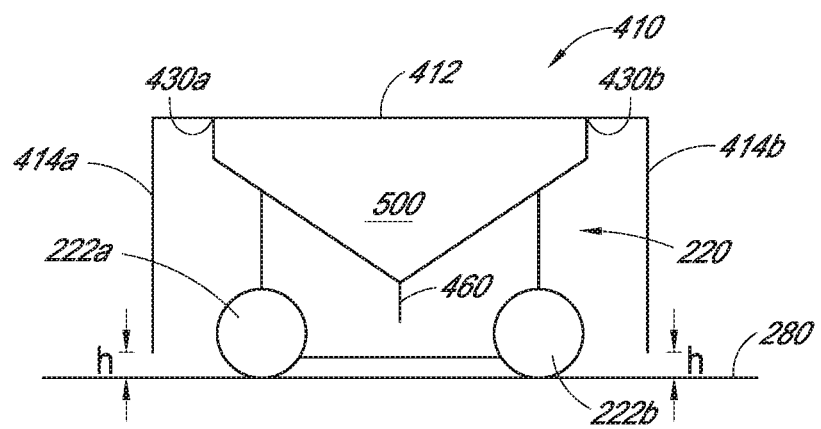
FIG. 4C is a pictorial diagram depicting illustrative components of the mobile drive unit shown in FIG. 4B lifting the inventory holder.

FIG. 4C is a pictorial diagram depicting illustrative components of the mobile drive unit shown in FIG. 4B lifting the inventory holder. The rolling elements 222a and 222b continued rotating to close the shortened space with the distance X−M shown in FIG. 4B. As shown in FIG. 4C, the wedge 500 includes a pointed apex with an angle corresponding to the angle formed at junction 460.

In closing the shortened space, the inventory holder 410 has lifted off of the ground surface 280 by a height h. The lift was caused by the force applied by the rolling elements 222a and 222b against the wedge 500 which in turn pressed the top surface 412 upward.

Figure 5A:
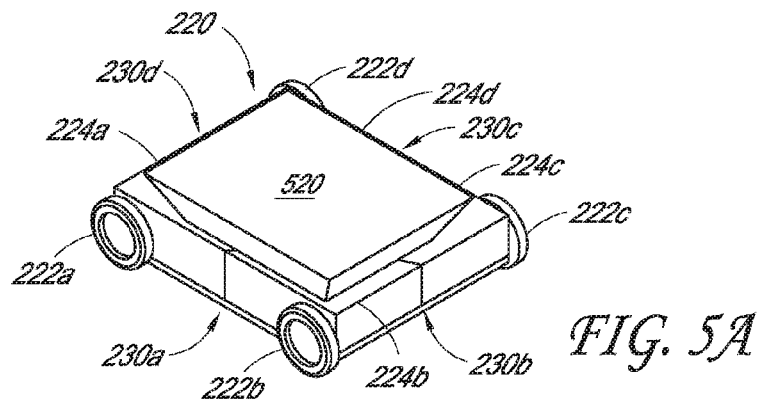
FIG. 5A is a pictorial diagram showing a perspective view of the mobile drive unit shown in FIG. 4A.

FIG. 5A is a pictorial diagram showing a perspective view of the mobile drive unit shown in FIG. 4A. The mobile drive unit 220 includes four rolling elements 222a, 222b, 222c, and 222d. Fewer or additional rolling elements may be included in a mobile drive unit. The rolling elements 222a, 222b, 222c, and 222d are positioned to raise a wedge 520 by contracting respective portions 224a, 224b, 224c, and 224d of the mobile drive unit 220 against the wedge 520. A portion (e.g., the portion 224a) may include a wedge block as described below with reference, for example, to FIG. 6A. A first junction 230a between the portion 224a and the portion 224b is shown. A second junction 230b between the portion 224b and the portion 224c is shown. A third junction 230c between the portion 224c and the portion 224d is also shown. A fourth junction between the portion 224d and the portion 224a is not shown in FIG. 5A because it is obstructed by the wedge 520. The geometry of the wedge 520 may be similar to the wedges shown in FIGS. 3B and 3C.

Figure 5B:
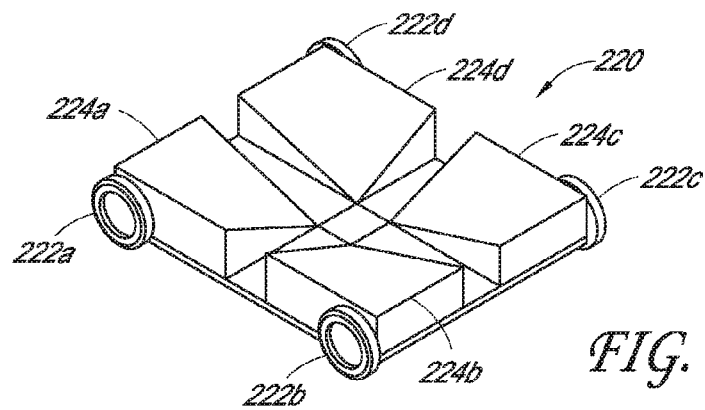
FIG. 5B is a pictorial diagram depicting an embodiment of a wedge that may be included in the mobile drive unit shown in FIG. 5A.

FIG. 5B is a pictorial diagram depicting the mobile drive unit shown in FIG. 5A with the wedge removed and in a lowered state. Each of the portions (e.g., portions 224a, 224b, 224c, and 224d) are separated. This separation produces a space 522 at the center of the mobile drive unit 220. The space 552 may be formed by a separation of distance X between the portion 224a and the portion 224b and between the portion 224d and the portion 224c. The space 522 may also be formed by a separation of distance Y between the portion 224a and the portion 224d and between the portion 224b and the portion 224c. Each portion (e.g., portions 224a, 224b, 224c, and 224d) may be mounted on an extendable chassis 524 that can expand and contract based on the drive applied to each rolling element (e.g., rolling elements 222a, 222b, 222c, and 222d).

Figure 5C:
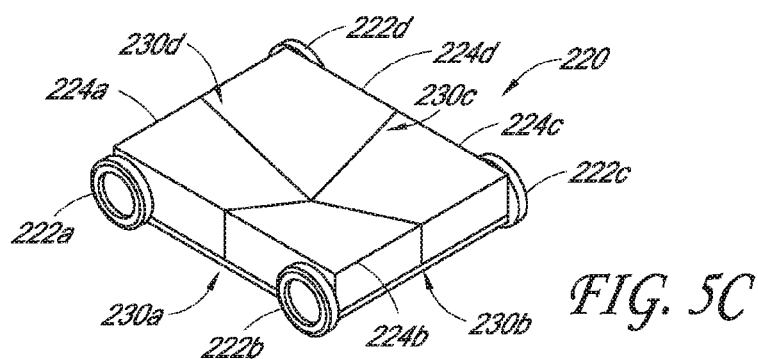
FIG. 5C is a pictorial diagram depicting another embodiment of a wedge that may be included in the mobile drive unit shown in FIG. 5A.

FIG. 5C is a pictorial diagram depicting the mobile drive unit shown in FIG. 5A with the wedge removed and in a lifted state. The mobile drive unit 220 in FIG. 5C does not include the space 522 shown in FIG. 5B. This space 522 may be removed by driving the rolling elements toward each other to join the portions at junctions 230a, 203b, 230c, and 230d.

Figure 5D:
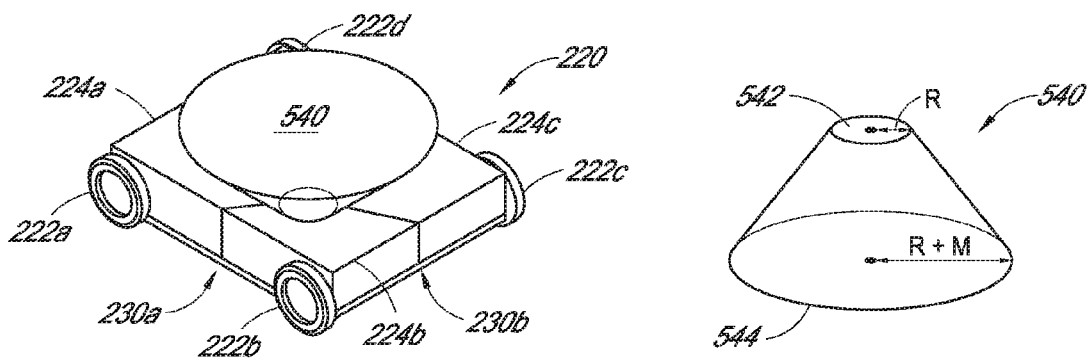
FIG. 5D is a pictorial diagram depicting another embodiment a mobile drive unit including a wedge.

FIG. 5D is a pictorial diagram depicting another embodiment a mobile drive unit including a conical wedge. The mobile drive unit 220 shown in FIG. 5D is similar to the mobile drive unit 220 shown in FIG. 5A; however, the wedge 540 in FIG. 5D has rounded surfaces rather than the flat surfaces for the wedge 520. The mobile drive unit 220 shown in FIG. 5D also includes only two junctions, a first junction 232a and a second junction that is not shown in FIG. 5D because it is obstructed by the wedge 540. The fourth rolling element 222d is also not shown in FIG. 5D because it is obstructed by the wedge 540. A bottom surface 542 of the wedge 540 may be circular and have a radius R. A top surface 544 of the wedge 540 may be circular and have a radius larger than R. As shown in FIG. 5D, the top surface 544 radius is R+M where M is a length greater than zero.

Figure 6A:
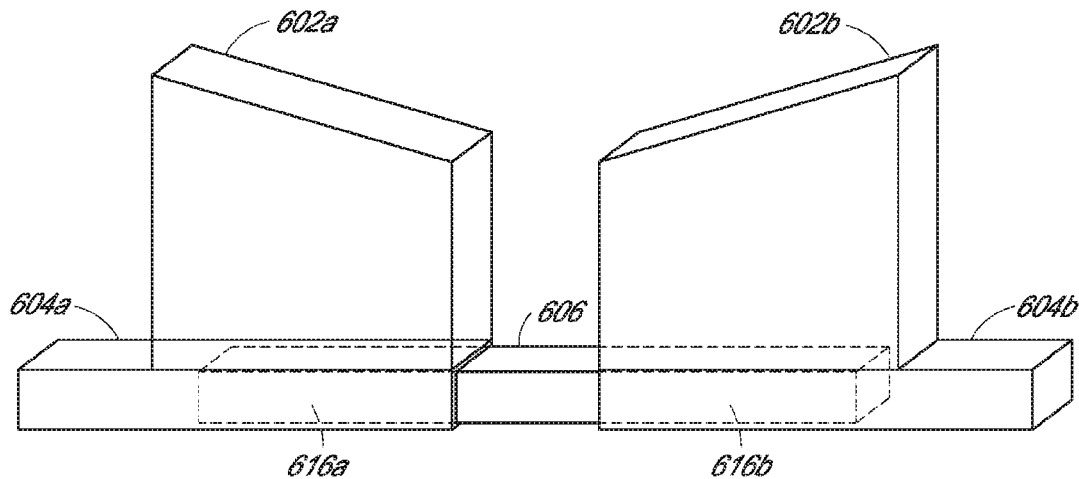
FIG. 6A is a pictorial diagram showing an embodiment of an extendable chassis with wedge blocks that may be included in a mobile drive unit in an extended state.

FIG. 6A is a pictorial diagram showing an embodiment of an extendable chassis with wedge blocks that may be included in a mobile drive unit in an extended state. As discussed with reference to FIG. 5B, the portion 224a may include a wedge block and be mounted on the extendable chassis 524. FIG. 6A shows one example arrangement of these elements. A first wedge block 602a and a second wedge block 602b are mounted on respective outer sleeve portions 604a and 604b of an extendable chassis. The surface of the wedge block that engages with a surface of a wedge may include features to alter the friction of the surface to facilitate lifting of the wedge. For example, the surface of the wedge block that engages with the wedge or a portion of the wedge that engages with the wedge block may include surface rolling elements such as rollers or bearings to reduce friction between the wedge block and the wedge. In some implementations, it may be desirable to increase surface friction to help maintain the lift. For example, the surface of the wedge block that engages with the wedge or a portion of the wedge that engages with the wedge block may include a surface treatment to increase friction.

An extension rod 606 may be included in a mobile drive unit. The extension rod 606 allows the wedge blocks to expand and contract, while retaining the structural integrity of the extendable chassis. As shown in FIG. 6A, the extension rod 606 has a first hidden portion 616a supporting at least a part of the first wedge block 602a and a second hidden portion 616a supporting at least a part of the second wedge block 602b. The rolling elements (not shown in FIG. 6A) may be mounted to the extendable chassis to adjust the location of the first wedge block 602a and the second wedge block 602b. For example, as one or more of the rolling elements pull the wedge blocks apart, a greater amount of the extension rod 606 will be exposed. The state of the arrangement shown in FIG. 6A generally corresponds to the state of the mobile drive unit 220 shown in FIG. 5B.

Figure 6B:
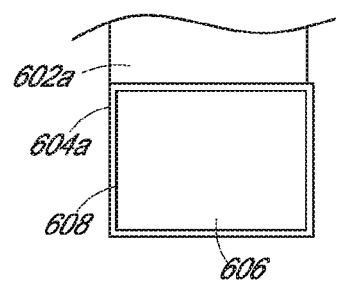
FIG. 6B is a pictorial diagram showing a cross-section of the extendable chassis with wedge blocks shown in FIG. 6A.

FIG. 6B is a pictorial diagram showing a cross-section of the extendable chassis with wedge blocks shown in FIG. 6A. The cross-section in FIG. 6B shows a portion of the first wedge block 602a mounted to the outer sleeve portion 604a of the extendable chassis. An inner sleeve portion 608 may receive the extension rod 606. The inner sleeve portion 608 may be a low friction surface to facilitate easy extension and contraction of the extendable chassis. In some implementations, the extension rod 606 or hidden portions thereof may be low friction in addition to or as an alternative to the inner sleeve portion 608.

Figure 6C:
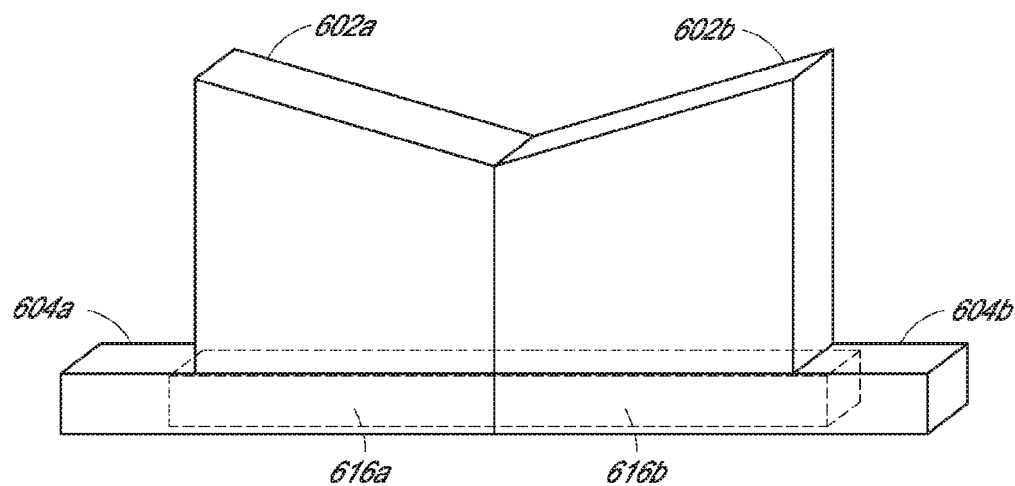
FIG. 6C is a pictorial diagram showing an embodiment of the extendable chassis with wedge blocks shown in FIG. 6A in a contracted state.

FIG. 6C is a pictorial diagram showing an embodiment of the extendable chassis with wedge blocks shown in FIG. 6A in a contracted state. The state of the arrangement shown in FIG. 6C generally corresponds to the state of the mobile drive unit 220 shown in FIG. 5C. In FIG. 6C, the extension rod is completely hidden. The hidden portions of the extension rod (e.g., 616a and 616b) support a greater portion of the respective wedge blocks (e.g., 602a and 602b). This provides additional structural support for the mobile drive unit 220 when the wedge blocks are engaged with a wedge and lifting an inventory holder.

Alternative or additional structures may be included to implement an extendable chassis. For example, the extension rod may be implemented in whole or in part as a telescoping rod. In such implementations, the telescoping portion may allow the extension rod to expand and contract to provide the support and lift described. Additional or alternative examples include linear guides and rotational guides.

The lift configurations described may include a wedge on the inventory holder or on the mobile drive unit. By independently driving the rolling elements of the mobile drive unit, the shape of the mobile drive unit can be changed to adjust the elevation of the wedge. In some implementations, the mobile drive unit may adjust its shape to form the wedge, without necessarily including a discrete wedge component.

Figure 7A:
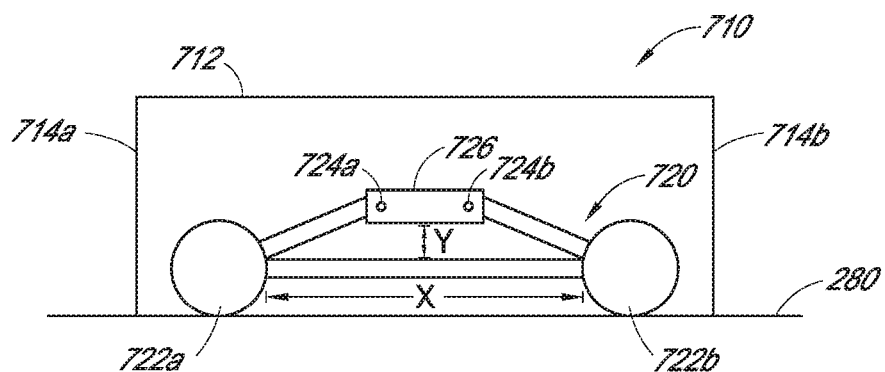
FIG. 7A is a pictorial diagram depicting illustrative components of another embodiment of a mobile drive unit prior to lifting an inventory holder.

FIG. 7A is a pictorial diagram depicting illustrative components of another embodiment of a mobile drive unit prior to lifting an inventory holder. The mobile drive unit 720 shown in FIG. 7A includes rolling elements 722a and 722b. As with the other mobile drive units described, the rolling elements 772a and 772b may each be driven independently by one or more motors. The mobile drive unit 720 may include a lifting surface 726. The lifting surface 726 may be coupled to respective rolling elements 722a and 722b via pivoting shafts 724a and 724b. When the rolling elements 722a and 722b are controlled to maintain a specific distance between each other (shown as X in FIG. 7A), the lifting surface 726 is elevated a distance of Y from the chassis of the mobile drive unit 720.

As shown in FIG. 7A, the mobile drive unit 720 is positioned beneath an inventory holder 710. The inventory holder 710 includes a first side 714a and a second side 714b. The first side 714a and the second side 714b support a top portion 712 included in the inventory holder 710. At this stage, the inventory holder 710 is not lifted and is resting on the ground surface 280.

Figure 7B:
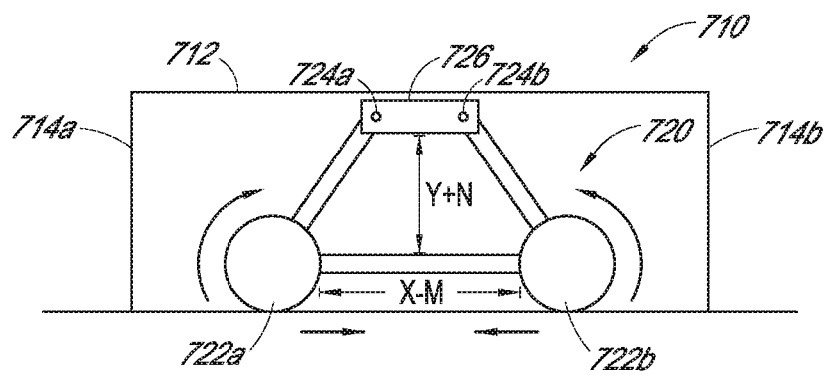
FIG. 7B is a pictorial diagram depicting illustrative components of the mobile drive unit shown in FIG. 7A preparing to lift the inventory holder.

FIG. 7B is a pictorial diagram depicting illustrative components of the embodiment of a mobile drive unit shown in FIG. 7A preparing to lift the inventory holder. In FIG. 7B, the rolling elements 722a and 722b are activated to move toward each other, thereby contracting the chassis. The contraction is shown as an amount M, thus the length of the chassis as shown in FIG. 7B is X–M where M is length greater than zero. This contraction causes the pivoting shafts 724a and 724b to move to a more vertical position than shown in FIG. 7A. In doing so, the lifting surface 726 is elevated. The distance between the lifting surface 726 is now Y+N, where N is a distance greater than zero.

Figure 7C:
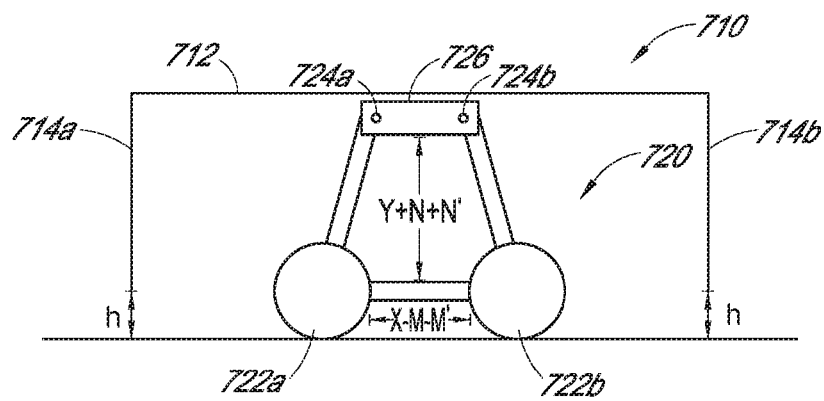
FIG. 7C is a pictorial diagram depicting illustrative components of the mobile drive unit shown in FIG. 7B lifting the inventory holder.

FIG. 7C is a pictorial diagram depicting illustrative components of the embodiment of a mobile drive unit shown in FIG. 7B lifting the inventory holder. The rolling elements 722a and 722b continue rotating to cause the chassis to have a length of X–M–M' where M and M' are distances greater than zero. In contracting the chassis, the lifting surface 726 lifts the inventory holder 710 off of the ground surface 280 by a height h. The lift is caused by the force applied by the rolling elements 222a and 222b transferred through the pivoting shafts 724a and 724b to drive the lifting surface 726 upward, away from the ground surface 280. The lifting surface 726 is now located Y+N+N' away from the chassis, where N and N' are distances greater than zero. As shown in FIG. 7C, the shape formed by the mobile drive unit 720 is similar to the isosceles trapezoid wedge discussed with reference to, for example, FIG. 3B. Thus, the mobile drive unit 720 can changes its shape to form the wedge used for lifting.

A mobile drive unit generally receives directions to perform the lifting described. For example, within an inventory warehouse, a mobile drive unit may receive a command to pick up an inventory holder at a first location and move it to a second location. The command may be provided by a management device to ensure safe and efficient operations within a workspace.

Figure 8:
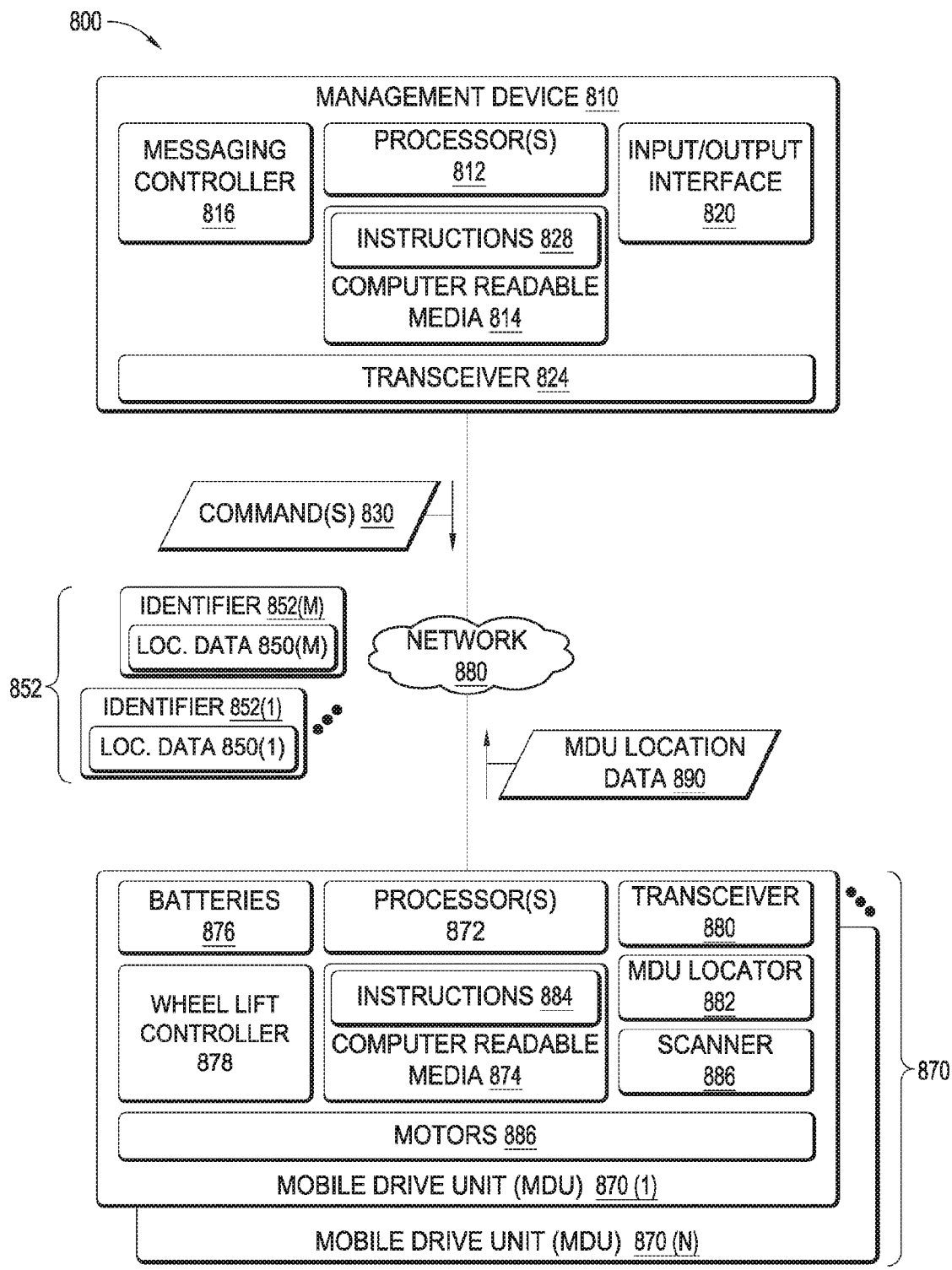
FIG. 8 is a pictorial diagram showing an illustrative environment for operating mobile drive units.

FIG. 8 is a pictorial diagram showing an illustrative environment for operating mobile drive units. The environment 800 includes identifiers (e.g., fiducial markers) to determine location information for mobile drive units. In some implementations, identifiers (e.g., fiducial markers), such as identifiers 852, may be used to determine a location of one or more of the mobile drive units (e.g., mobile drive units 870(1) to 870(N), where N is greater than 1). For example, the identifiers 852(1) to 852(M), where M is greater than 1, may be placed at various locations in an area (e.g., the workspace 170 of FIG. 1). Each of the identifiers 852 may include or be associated with corresponding location data 850(1) to 850(M). An identifier 852 may comprise an optical code (e.g., a bar code, a two-dimensional bar code (such as a "quick response" or QR® code), or other type of scannable code) that can be read using an imaging device, such as an optical scanner. Alternatively, an identifier 852 may include a radio frequency identifier (RFID) tag, near field communication (NFC) tag or the like that stores information thereon that can be transmitted to, or read by, other devices. In some cases, an identifier 852 may include location information, such as the location data 850 that identifies a location within an area corresponding to each of the identifiers 852.

Each of the mobile drive units 870(1) through 870(N) may include an imaging device, such as a scanner 886, that is capable of scanning (e.g., reading) the identifiers 852. Each time a particular one of the mobile drive units 870 passes by or over one of the identifiers 852, the scanner 886 may scan one of the identifiers 852 and send a message 890 including mobile drive unit location data to a management device 810. For example, the mobile drive unit location data included in the message 890 may include a unique identifier obtained when the mobile drive unit scans an identifier. The management device 810 may determine a location of one or more of the mobile drive units 870 after receiving the message 890. For example, the mobile drive unit 870(1) may send a message that includes the information uniquely identifying the identifier 852(1). The management device 810 may receive the mobile drive unit the message 890 including the information uniquely identifying the identifier 852(1), determine that the information uniquely identifying an identifier 852 is associated with the identifier 852(1), and determine a location of the identifier 852(1) to determine the location of mobile drive unit 870(1). The management device 810 may be similar to the management device 115 shown in FIG. 1.

Thus, identifiers, such as fiducial markers, where each fiducial marker has a unique corresponding identifier, may be used to determine a location of the mobile drive units 870. The management device 810 may send one or more command messages 830 instructing one or more of the mobile drive units 870. A command message may instruct a mobile drive unit to cease performing the set of activities. A command message may instruct a mobile drive unit to move to a new location, cease performing any activity, navigate away from a location, move an inventory holder from a first location to a second location, or any combination thereof.

Messages may be transmitted between entities in the environment 800 via a network 880. The network 880 may include one or more networks, including a wired network, a wireless network, or both. The network 880 may include technologies such as Ethernet, Data Over Cable Service Interface Specification (DOCSIS), Fiber Optic cable, WiFi® (e.g., 802.11), BLUETOOTH®, Global System for Mobile (GSM), Long Term Evolution (LTE), Universal Mobile Telephone Service (UMTS), Code Division Multiple Access (CDMA), another type of network technology, or any combination thereof.

Each mobile drive unit 870 may include one or more processors 872, one or more memory devices (e.g., a computer readable media 874), one or more batteries (or other power sources) 876, a locomotion controller 878, a transceiver 880, an mobile drive unit (MDU) locator 882, one or more drive mechanisms, such as motors 888, or any combination thereof. The computer readable media 874 may include non-transitory media to store instructions 884 that are executable by the processor(s) 872 to perform the various functions of the mobile drive unit 870. The locomotion controller 878 may govern the behavior of the mobile drive unit 870 to drive the rolling elements of the mobile drive unit 870 to perform the wedge based lifting described. The transceiver 880 may transmit and receive messages using the network 880. The mobile drive unit locator 882 may transmit a location of the mobile drive unit 870 to the management device 810 using the transceiver 880.

The rolling elements of a mobile drive unit may each receive separate force. In some instances, the separate forces may be provided from separate motors or separate transmission paths from a single motor. This allows each rolling element to be driven independently of the force used to drive another rolling element. The mobile drive unit may also include a chassis having an adjustable length. A chassis having an adjustable length may be referred to as an extendable chassis. The length of the chassis may be determined by an amount of drive force applied to each rolling element. The length may be bounded by a maximum length and a minimum length for the chassis. The mobile drive unit may include wedge blocks mounted on the chassis. A first wedge block may include a first surface sloping downward from a first end of the chassis toward a second end of the chassis. A second wedge block may include a second surface sloping downward from the second end toward the first end.

A mobile drive unit may receive commands from the management device 810. The management device 810 may include one or more processors 812, one or more memory devices, such as computer readable media 814, a messaging controller 816, an input/output interface 820, a transceiver 824, or any combination thereof. The computer readable media 814 may include instructions 828 that are executable by the processor(s) 812 to perform the various functions of the management device 810. The messaging controller 816 may determine which particular messages are to be sent to particular mobile drive units. The input/output interface 820 may include various input and output devices, such as a keyboard a mouse, a trackball, a display device, other input/output devices, and the like. The transceiver 824 may be used to send messages to and receive messages from the mobile drive units, such as the message 890 and the command message 830.

Additional examples structures and techniques for coordinating the actions of mobile drive units with a management device are described in U.S. patent application Ser. No. 14/472,717, filed on Aug. 29, 2014 and titled "SAFETY COMPLIANCE FOR MOBILE DRIVE UNITS," the entire disclosure of which is herein incorporated by reference.

Figure 9:
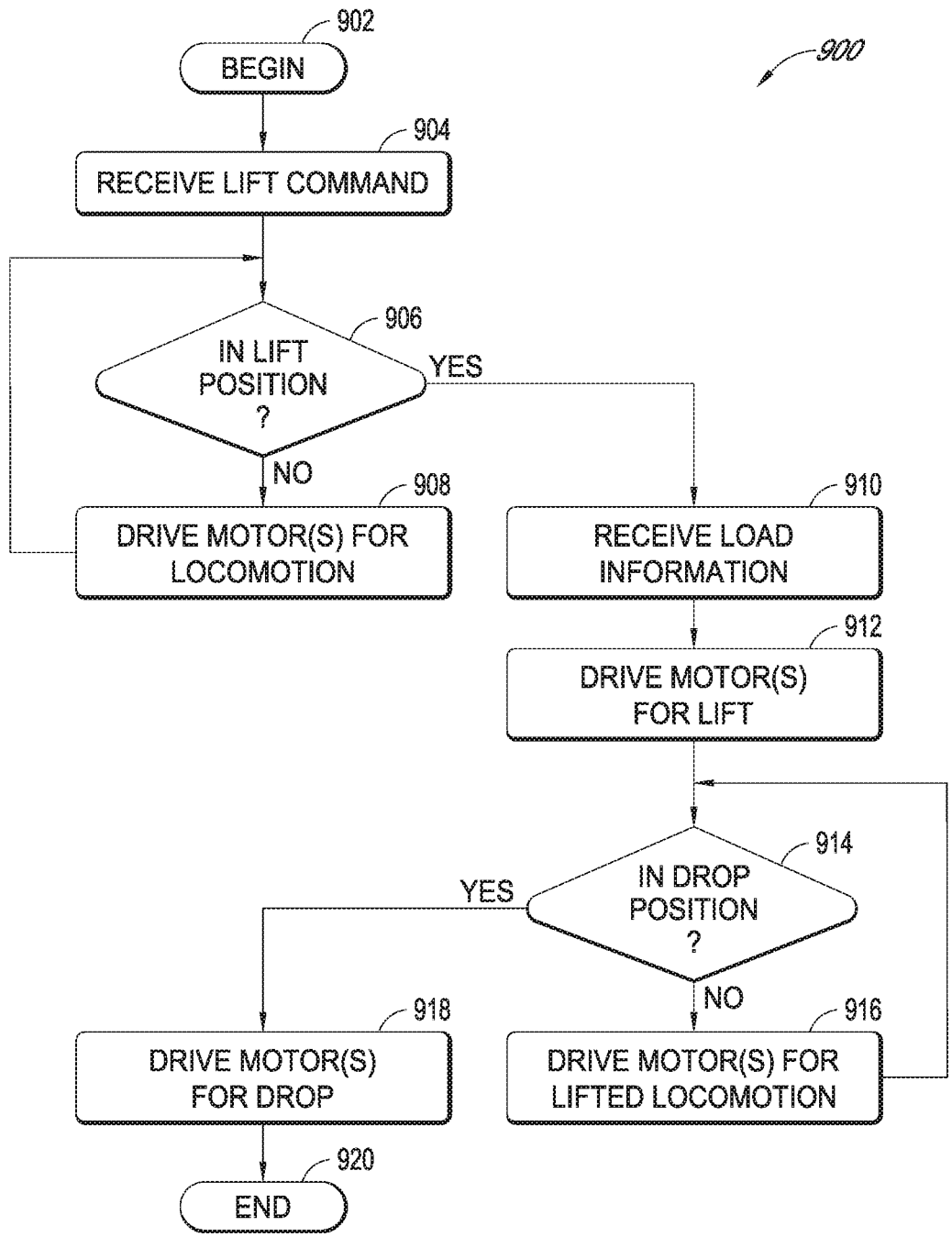
FIG. 9 is a process flow diagram of an illustrative method of wedge based lifting.

FIG. 9 is a flow diagram of an illustrative process of wedge based lifting. The process 900 shown in FIG. 9 illustrates how an item can be lifted and moved to a new location within an area by a mobile drive unit. The process 900 describes controlling the mobile drive unit prior to lifting to ensure proper force is applied to each rolling element. This ensures efficient use of power resources and serves as a safety check to ensure the commanded mobile drive unit has sufficient resources (e.g., power, motor) to lift and carry the inventory holder and items stored in the inventory holder. Once lifted, the process 900 may continually monitor the locomotion and lift to ensure the inventory holder is elevated to a desired height during transit to the final destination. This can be particularly important in environments with uneven or unpredictable ground surfaces. The process 900 shown in FIG. 9 may be implemented in whole or in part by a mobile drive unit such as discussed in FIG. 1, 2A, 4A, 5A, 5D, 7A, or 8 above to lift and move an inventory holder. Some or part of the process 900 shown in FIG. 9 may be implemented by or in conjunction with a management device such as those shown in FIG. 1 or 8 and discussed above.

The process 900 begins at block 902. At block 904, a mobile drive unit receives a lift command. The lift command may be received in a command message transmitted by the management device, such as the management device 115 shown in FIG. 1 or the management device 810 shown in FIG. 8. The lift command may be received via wired and/or wireless means. The lift command may be formatted according to a machine readable standardized format. Receiving the lift command may include monitoring a message transmitted from the management device, detecting a command message including an identifier for the mobile drive unit, decoding the command message to determine the type is a lift command and the associated parameters for the lifting. The parameters may include a location identifier for where the payload is located. The parameters may include a destination for the payload. The parameters may include a priority for the command. The priority may be used to allow mobile drive units executing high priority commands right of way through the workspace. In some implementations, receiving the lift command may include generating and transmitting an acknowledgment message to the management device. The acknowledgment message can be used by the management device to determine whether the target mobile drive unit has received and will execute the command.

The command message parameters may include a route. A route may refer to a scheduled path from the current location of the mobile drive unit to one or more destinations. The route may identify desired speeds for portions of the route. The route may also include elevation information indicating the height of the ground surface along the route. The route information may be used by the mobile drive unit to ensure the lifted inventory holder is consistently elevated from the ground surface during locomotion.

At block 906, a determination is made as to whether the mobile drive unit is in position to lift. The determination may include comparing the current location of the mobile drive unit with the location of the inventory holder identified by the lift command. As described above, the mobile drive unit may sense a location identifier on the inventory holder or on the ground surface under the inventory holder to ensure proper alignment for wedge lifting. In some implementations, the sensors may be embedded in the wedge blocks or the wedge to detect positioning of the mobile drive unit in relation to the inventory holder.

If the mobile drive unit is not in position to lift, the process 900 proceeds to block 908. At block 908, the mobile drive unit drives one or more motors included in a drive system to activate corresponding rolling elements. The activation causes the mobile drive unit to move. The movement may be dictated by the route identified for the mobile drive unit performing the lift command. For example, the mobile drive unit may detect a location identifier and determine a current location for the mobile drive unit relative to the location associated with the location identifier. By comparing the current location with the planned route, the mobile drive unit can determine where to move next to complete the assigned lift command. In some implementations, the mobile drive unit may include a locomotion controller configured to coordinate the movement of the mobile drive unit. The mobile drive unit may then activate the rolling elements to achieve the desired movement and the process 900 returns to block 906.

At block 906, if it is determined that the mobile drive unit is located in the lift position, at block 910, the mobile drive unit receives load information for the inventory holder. Because the inventory holder may have had items added or removed between the time the mobile drive unit received the lift command and when the mobile drive unit arrives at the lift position, it may be desirable to receive the load information proximate to the time when the lifting will occur. The load information may be received in a message from the management device. The message may be transmitted by the management device, such as upon detecting the location of the mobile drive unit. The message may be received in response to a request message from the mobile drive unit. The load information may be provided as a weight total for the inventory holder and any items stored thereon. The load information may be provided as drive information indicating how much each rolling element of the mobile drive unit should be driven to lift the inventory holder. Providing the pre-calculated drive information may be desirable where the processing capabilities of the mobile drive unit are limited and performing load calculations are better suited to a computing device separate from the mobile drive unit.

Having identified the load to be lifted, at block 912, one or more of the motors included in the drive system to drive one or more rolling elements of the mobile drive unit to cause the lifting. For example, the chassis of the mobile drive unit may be configured to contract when a first motor drives a first rolling element in a first direction toward the center of the chassis and a second motor drives a second wheel in a second direction opposite the first direction. Driving the wheels may include identifying a voltage to supply to a motor to achieve the torque needed to lift the inventory holder. The voltage may be identified based at least in part on characteristics of the motor, characteristics of the power supply, and the load to be lifted. If the mobile drive unit includes variable gears to transfer the torque from the motor to a rolling element, a gear configuration for the mobile drive unit may be identified at block 912. The gear configuration is another factor that can be used to determine how to drive the motor(s) of the mobile drive unit to lift the inventory holder. For example, the gear configuration may be selected to increase the torque generated by the motor to a desired level to lift the inventory holder. In some implementations, the lifting at block 912 may include activating a mechanical lift lock to secure the position of the wedge blocks of the mobile drive unit. The mechanical lift lock may lock the extendable chassis at the position whereby the inventory holder is lifted the desired amount.

Once the inventory holder is lifted, the mobile drive unit, at block 914, determines whether it is in the drop position. The drop position indicates the location where the lifted inventory holder should be delivered. The drop position may be identified in the lift command. In some implementations, the mobile drive unit may confirm the drop position to ensure no change in the plan for the inventory hold. For example, an initial location may be identified in the lift command message that, by the time the inventory holder is lifted, becomes unavailable to accommodate the lifted inventory holder. In such instances, the management device may provide an updated route and/or drop position to the mobile drive unit.

The determination at block 914 may include comparing the current location of the mobile drive unit with the drop position for the lifted inventory holder. As described above, the mobile drive unit may sense a location identifier to determine a current location of the mobile drive unit.

If the determination at block 914 is negative, at block 916, one or more of the motors included in the drive system of the mobile drive unit are driven for lifted locomotion. Because the inventory holder is lifted by maintaining a chassis length to support the wedge in a lifted position, as the rolling elements are driven propel the mobile drive unit, the chassis length must also be maintained to ensure the inventory holder is lifted from the ground surface such as 1.75-2 inches. The locomotion controller, or other component of the mobile drive unit, may identify a voltage to supply to a motor to achieve the torque needed to lift the inventory holder and move the mobile drive unit. The voltage may be identified based at least in part on characteristics of the motor, characteristics of the power supply, the load to be lifted, and the direction of movement. The direction of movement may be identified using route information, such as the route information included in or identified by the lift command message.

If the drive system of the mobile drive unit includes variable gears to transfer the torque from the motor to a rolling element, a gear configuration for the mobile drive unit may be identified at block 916. The gear configuration is another factor that can be used to determine how to drive the motor(s) of the mobile drive unit for lifted locomotion of the inventory holder. For example, the gear configuration may be selected to increase the torque generated by the motor to a desired level to lift the inventory holder and move the mobile drive unit in a desired direction.

As discussed above, driving a motor for lifted locomotion may also include sensing changes in the ground surface. The changes may be sensed for each rolling element such that any difference exceeding a threshold will cause an adjustment to the drive of at least one motor to maintain the lift of the inventory holder. For example, if the locomotion controller, or other component of the mobile drive unit, detects that rolling elements at the front of the mobile drive unit are approaching a door threshold raised above the ground surface, the mobile drive unit may need to increase the height of the inventory holder from the ground surface to clear the door threshold. In such instances, the motors may be driven to continue forward motion of the mobile drive unit while also shortening the chassis to raise the lifted inventory holder to a height that will clear the door threshold.

The ground surface changes may be detected using one or more sensors such as a camera, an accelerometer, a laser or other light measuring system, or an optical sensor. The ground surface changes may be detected using information received from one or more location identifiers. Information about ground surface changes may be included in the route information provided to the mobile drive unit. In some implementations, the sensor may measure the distance from the chassis of the mobile drive unit to a ground surface.

Once the motor(s) are driven for lifted locomotion, the process 900 returns to block 914 to determine again whether the mobile drive unit has reached the drop position. If the determination at block 914 is affirmative, at block 918, the mobile drive unit drives one or more of the motors included in the drive system to drop the inventory holder. For example, the chassis of the mobile drive unit may be configured to extend when a first motor drives a first rolling element in a first direction, away from the center of the chassis, and a second motor drives a second wheel in a second direction opposite the first direction. Driving the wheels may include identifying a voltage to supply to a motor to achieve the torque needed to safely lower the inventory holder. The voltage may be identified based at least in part on characteristics of the motor, characteristics of the power supply, and the load being lifted. If the mobile drive unit includes variable gears to transfer the torque from the motor to a rolling element, a gear configuration for the mobile drive unit may be identified at block 914. The gear configuration is another factor that can be used to determine how to drive the motor(s) of the mobile drive unit to safely lower the inventory holder. For example, the gear configuration may be selected to increase the torque generated by the motor to a desired level to lower the inventory holder to the ground surface. The dropping at block 918 may include deactivating the mechanical lift lock, if included in the mobile drive unit, to allow the inventory holder to be lowered.

Figures 10A, 10B:
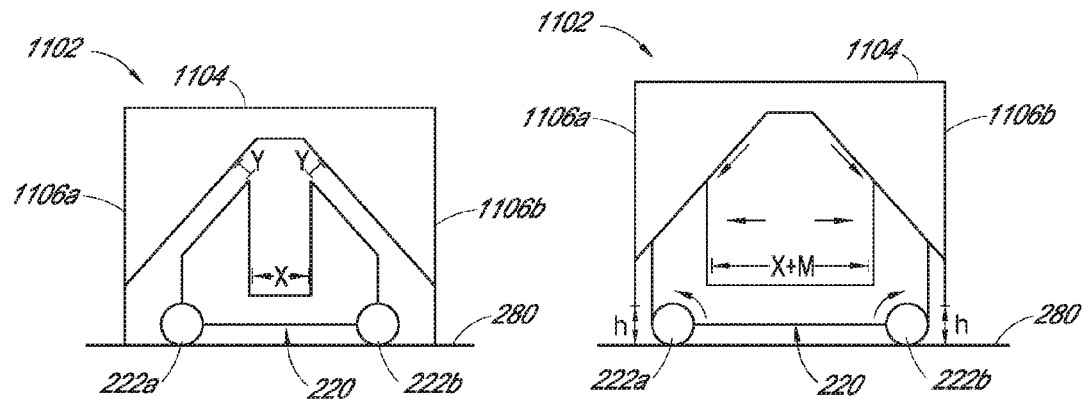
FIG. 10A is a pictorial diagram depicting illustrative components of another embodiment of a mobile drive unit prior to lifting an inventory holder.
FIG. 10B is a pictorial diagram depicting illustrative components of the mobile drive unit shown in FIG. 10A lifting the inventory holder.

FIG. 10A is a pictorial diagram depicting illustrative components of another embodiment of a mobile drive unit prior to lifting an inventory holder. The mobile drive unit 220 may have received a command from the management device 115 to move an inventory holder 1002 from a first location to a second location within the workspace 170.

The mobile drive unit 220 shown in FIG. 10A is positioned beneath the inventory holder 1002. The inventory holder 1002 may include a wedge portion 1004 supported between a first side 1006*a* and a second side 1006*b* of the inventory holder 1002. In the illustrated embodiment, the first side 1006*a* and the second side 1006*b* are perpendicular to the ground surface 280. The first rolling element 222*a* and the second rolling element 222*b* may be included in the mobile drive unit 220. Each rolling element (e.g., 222*a* and 222*b*) may be independently driven by a force from a drive system. In some implementations, each rolling element may be driven by a corresponding motor included in the drive system.

As shown in FIG. 10A, the mobile drive unit 220 is contracted such that a space X is created near the middle of the mobile drive unit 220. The mobile drive unit 220 may be separated from the wedge portion 1004 by a gap having a distance Y. The gap allows the mobile drive unit 220 to adjust its location beneath the inventory holder 1002 to ensure proper alignment for lifting. The proper alignment may include sensing an identifier for a location beneath the inventor holder 1002 such as on the ground surface 280 or on the bottom surface of the wedge portion 1004. For example, an identifier indicating the center point of the wedge portion 1004 may be included on the inventory holder 1002. Using location information associated with the identifier and the current location of the mobile drive unit 220, the mobile drive unit 220 can adjust its position to be centered under the inventory holder 1002.

It will be appreciated that the force that will be applied to lift the inventory holder 1002 is similar to that shown in, for example, FIG. 2A. However, rather than compressing the chassis of the mobile drive unit 202 to achieve lift, the mobile drive unit 202 in FIG. 10A will expand to press against the wedge portion 1004 to achieve the lift.

FIG. 10B is a pictorial diagram depicting illustrative components of the mobile drive unit shown in FIG. 10A lifting the inventory holder. The rolling elements 222*a* and 222*b* rotate away from each other to enlarge the space X by a distance of M. In expanding the space, the inventory holder 1002 is lifted off of the ground surface 280 by a height h. The lift is caused by the force applied by the rolling elements 222*a* and 222*b* against the wedge portion 1004.

Figures 11A, 11B:
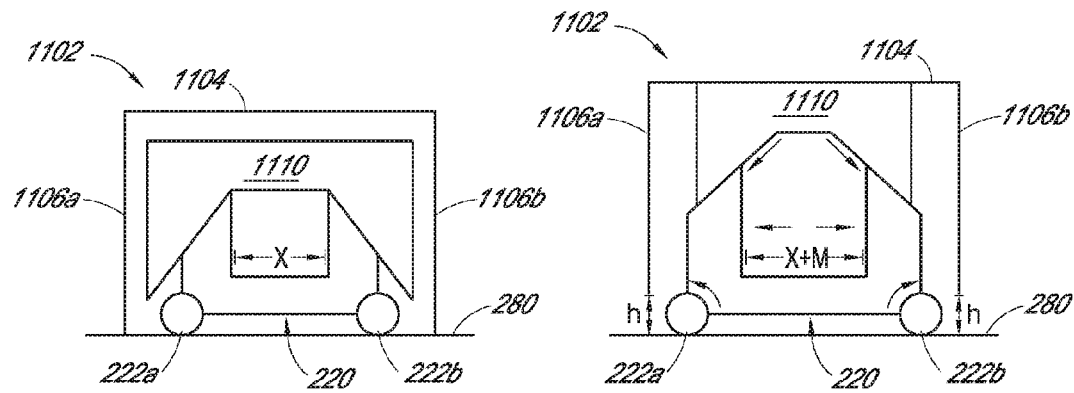
FIG. 11A is a pictorial diagram depicting illustrative components of an embodiment of a mobile drive unit including a wedge portion and configured for wedge based lifting prior to lifting an inventory holder.
FIG. 11B is a pictorial diagram depicting illustrative components of the mobile drive unit shown in FIG. 11A lifting the inventory holder.

FIG. 11A is a pictorial diagram depicting illustrative components of an embodiment of a mobile drive unit including a wedge portion and configured for wedge based lifting prior to lifting an inventory holder. The mobile drive unit 220 may have received a command from the management device 115 to move an inventory holder 1102 from a first location to a second location within the workspace 170.

The mobile drive unit 220 shown in FIG. 11A is positioned beneath the inventory holder 1102. In FIG. 10A, the wedge portion 1004 was included in the inventory holder 1002. In the embodiment shown in FIG. 11A, the mobile drive unit 220 includes a wedge portion 1110. The inventory holder 1102 may include a first side 1106*a* and a second side 1106*b*. The first side 1106*a* and the second side 1106*b* may be perpendicular to the ground surface 280. A top portion 1104 may be supported by the first side 1102*a* and the second side 1102*b*. As shown in FIG. 11A, the wedge portion 1110 is separated from the top portion 1104. The first rolling element 222*a* and the second rolling element 222*b* may be included in the mobile drive unit 220. Each rolling element (e.g., 222*a* and 222*b*) may be independently driven by a force from a drive system. In some implementations, each rolling element may be driven by a corresponding motor included in the drive system. The mobile drive unit 220 may adjust its location beneath the inventory holder 1102 to ensure proper alignment for lifting. The proper alignment may include sensing an identifier for a location beneath the inventory holder 1102 such as on the ground surface 280 or on the bottom surface of the wedge portion 1110. Using location information associated with the identifier and the current location of the mobile drive unit 220, the mobile drive unit 220 can adjust its position to be centered under the inventory holder 1102. As shown in FIG. 2A, the mobile drive unit 220 is contracted such that a space X is created near the middle of the mobile drive unit 220.

FIG. 11B is a pictorial diagram depicting illustrative components of the mobile drive unit shown in FIG. 11A lifting the inventory holder. The rolling elements 222*a* and 222*b* may rotate away from each other to expand the space X by a distance M. By expanding the space, the inventory holder 1102 has lifted off of the ground surface 280 by a height h. The lift was caused by the force applied by the rolling elements 222*a* and 222*b* against the wedge portion 1110 which in turn pressed the top surface 1104 upward.

Figure 12:
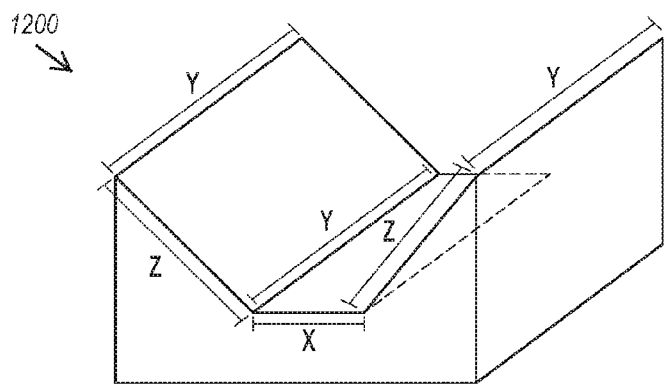
FIG. 12 is a pictorial diagram depicting an embodiment of a wedge portion.

FIG. 12 is a pictorial diagram depicting an embodiment of a wedge portion. The wedge portion 1200 may be included as the wedge portion 1110 in FIG. 11A or the wedge portion 1004 in FIG. 10A. The wedge portion 1200 shown in FIG. 12 is oriented upside down from the wedge portion 1110 shown in FIG. 11A to facilitate description of the relationship between the faces of the wedge portion 1200. The shape of the wedge portion 1200 may generally be described as a negative of the isosceles trapezoid shown in FIG. 3B. Thus, the wedge 320 shown in FIG. 3B may fit into the wedge portion 1200 to form a solid rectangular block.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a mobile drive unit, management device, or other hardware included in an inventory system. The mobile drive unit, management device, or other hardware included in an inventory system may include a digital signal processor (DSP), an application specific integrated circuit (ASIC), a field programmable gate array (FPGA), a microprocessor, a controller, microcontroller, or other programmable logic element, discrete gate or transistor logic, discrete hardware components, or any combination thereof. Devices used to implement the inventory system are specially designed to perform the lifting and locomotion described herein. One or more of the devices included in the inventory system may include electrical circuitry configured to process specific computer-executable to perform one or more of the features described herein. In embodiments where a device includes a FPGA or similar programmable elements, the inventory system (or a device included therein) may provide one or more of the features described processing without processing computer-executable instructions but instead by configuring the FPGA or similar programmable element to perform the recited features. Although described herein primarily with respect to digital technology, aspects of the inventory system may also include primarily analog components. For example, some or all of the lifting and locomotion features described herein may be implemented in analog circuitry or mixed analog and digital circuitry.

The elements of a method, process, routine, or algorithm described in connection with the embodiments disclosed herein can be embodied directly in inventory system hardware, in a software module executed by one or more devices included in the inventory system, or in a combination of the two. A software module can reside in RAM memory, flash memory, ROM memory, EPROM memory, EEPROM memory, registers, hard disk, a removable disk, a CD-ROM, or similar form of a non-transitory computer-readable storage medium. An illustrative storage medium can be coupled to the inventory system such that the inventory system (or a device included therein) can read information from, and write information to, the storage medium. In the alternative, the storage medium can be integral to the inventory system or device having a need therefor.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML, document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein, "activate" or "activating" may refer to causing or triggering a mechanical, electronic, or electromechanical state change to a device. Activation of a device may cause the device, or a feature associated therewith, to change from a first state to a second state. In some implementations, activation may include changing a characteristic from a first state to a second state such as, for example, changing the viewing state of a lens of stereoscopic viewing glasses. Activating may include generating a control message indicating the desired state change and providing the control message to the device to cause the device to change state.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. A mobile drive unit comprising:
  a first wheel;
  a second wheel;
  a drive system coupled to provide a first force to drive the first wheel and to provide a second force to drive the second wheel;
  a chassis having the first wheel mounted at a first end and the second wheel mounted at a second end, the second end opposite the first end, wherein the chassis is configured to extend when (i) the first force drives the first wheel in a first direction and (ii) the second force drives the second wheel in a second direction opposite the first direction, and wherein the chassis is configured to contract when (i) the second force drives second first wheel in the first direction and (ii) the first force drives the first wheel in the second direction;
  a first wedge block having a first surface sloping downward from the first end toward the second end;
  a second wedge block having a second surface sloping downward from the second end toward the first end, wherein the first wedge and the second wedge are mounted on the chassis, and wherein the first wedge block joins with the second wedge block when the chassis is contracted; and
  a wedge supported by the first wedge block and the second wedge block, wherein a change in a length of the chassis causes a change in distance between the first wedge block and the second wedge block which causes a change in height for a top surface of the wedge.

2. The mobile drive unit of claim 1, further comprising:
  an optical sensor configured to measure a distance from the chassis to the ground at one of the first end or the second end, wherein the first motor drives the first wheel and the second motor drives the second wheel to move the mobile drive unit, wherein the drive applied to each wheel is adjusted during locomotion to maintain a speed for the mobile drive unit and a distance from the top surface of the wedge to the ground.

3. The mobile drive unit of claim 1, wherein the first surface sloping downward comprises a first roller and the second surface sloping downward comprises a second roller, and wherein the first roller and the second roller reduce friction between: (i) the first surface and the wedge; and (ii) the second surface and the wedge.

4. The mobile drive unit of claim 1, wherein a portion of the wedge supported by the first sloped surface comprises a roller, and wherein the roller reduces friction between the first sloped surface and the wedge.

5. A mobile drive unit comprising:
  a first rolling element and a second rolling element, wherein the first rolling element is driven by a first drive force and the second rolling element is driven by a second drive force;
  a chassis having an adjustable length, wherein the first rolling element and the second rolling element are coupled with the chassis, wherein a length of the chassis determined by the first drive force and the second drive force, wherein the length is between a maximum length and a minimum length;
  a first wedge block having a first surface sloping downward from a first end of the chassis toward a second end of the chassis; and
  a second wedge block having a second surface sloping downward from the second end toward the first end, wherein the first wedge block and the second wedge block are mounted on the chassis, and wherein the first wedge block joins with the second wedge block when the chassis is at the minimum length, and wherein a change in the length of the chassis causes a change in distance between the first wedge block and the second wedge block.

6. The mobile drive unit of claim 5, further comprising:
  a wedge supported by the first wedge block and the second wedge block, wherein the change in distance between the first wedge block and the second wedge block causes a change in height for a top surface of the wedge.

7. The mobile drive unit of claim 6, wherein the first surface comprises a first surface rolling element and the second surface comprises a second surface rolling element, and wherein the first surface rolling element and the second surface rolling element reduce friction between: (i) the first surface and the wedge; and (ii) the second surface and the wedge.

8. The mobile drive unit of claim 6, wherein a portion of the wedge supported by the first surface comprises a surface rolling element, and wherein the surface rolling element reduces friction between the first surface and the wedge.

9. The mobile drive unit of claim 6, further comprising:
  a sensor configured to measure a distance from the chassis to the ground at one of the first end or the second end; and
  a locomotion controller configured to:

determine the distance from the chassis to the ground is below a threshold distance; and adjust at least one of the first drive force for the first rolling element or the second drive force for the second rolling element during locomotion of the mobile drive unit to maintain a speed for the mobile drive unit and a distance from the top surface of the wedge to the ground.

10. The mobile drive unit of claim 5, further comprising:

a locomotion controller configured to:

drive at least one of a first rolling element with a first drive force and a second rolling element with a second drive force to position the mobile drive unit beneath an inventory holder configured to hold at least one inventory item; and determine at least one of the first drive force and the second drive force using a weight of the inventory holder, wherein the first drive force and the second drive force elevate a wedge supported by the first wedge block and the second wedge block.

11. The mobile drive unit of claim 10, wherein the mobile drive unit further comprises the wedge.

12. The mobile drive unit of claim 10, wherein the locomotion controller is configured to drive the at least one of the first rolling element and the second rolling element by:

transmitting a current location for the mobile drive unit and an identifier for the inventory holder to a route planning service;

receiving route information identifying a path from the current location to the inventory holder;

driving the at least one of the first rolling element and the second rolling element based at least in part on the route;

detecting an alignment identifier beneath the inventory holder, the alignment identifier identifying a center point of the inventory holder; and driving the at least one of the first rolling element and the second rolling element to align the wedge with the first wedge block and the second wedge block using the identified center point.

\* \* \* \* \*

UNITED STATES PATENT AND TRADEMARK OFFICE
CERTIFICATE OF CORRECTION

PATENT NO. : 10,144,587 B2  
APPLICATION NO. : 15/276566  
DATED : December 4, 2018  
INVENTOR(S) : Andrew Stubbs et al.

Page 1 of 1

It is certified that error appears in the above-identified patent and that said Letters Patent is hereby corrected as shown below:

In the Specification

Column 20, Line 33, change "XML," to --XML--.

Signed and Sealed this  
Fifth Day of May, 2020

Andrei Iancu  
*Director of the United States Patent and Trademark Office*